July 17, 1962 J. H. PAYNE, JR 3,044,947
APPARATUS FOR LOADING AND UNLOADING A MACHINE
Filed Oct. 24, 1956 6 Sheets-Sheet 1

INVENTOR.
John H. Payne, Jr.
BY
Roland A. Anderson
Attorney

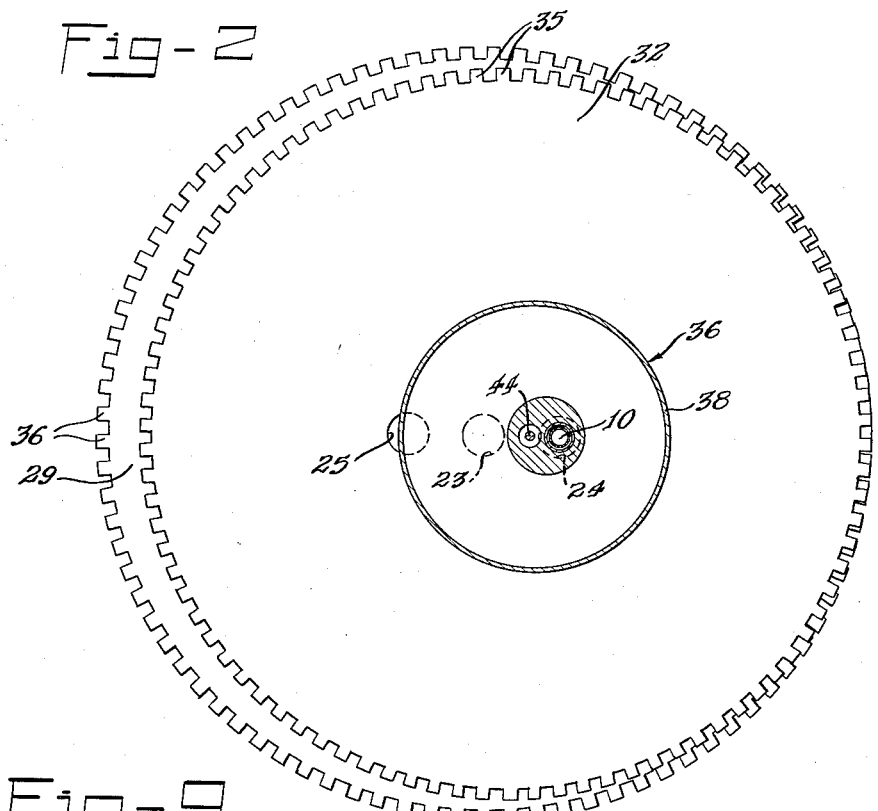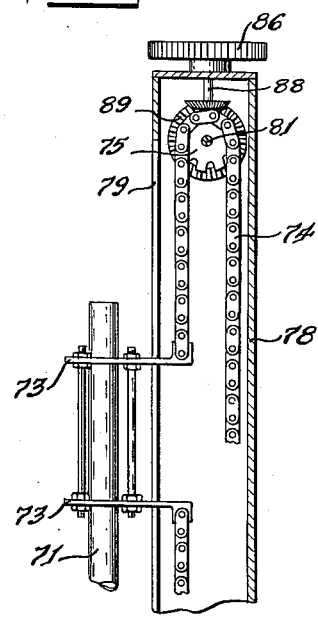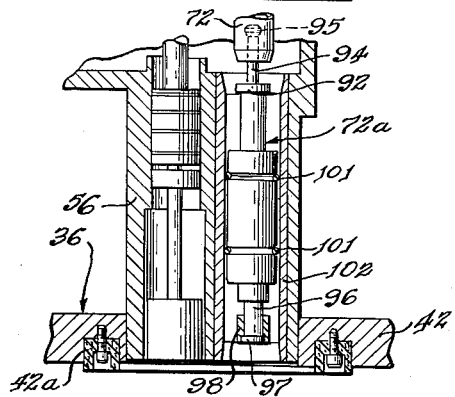

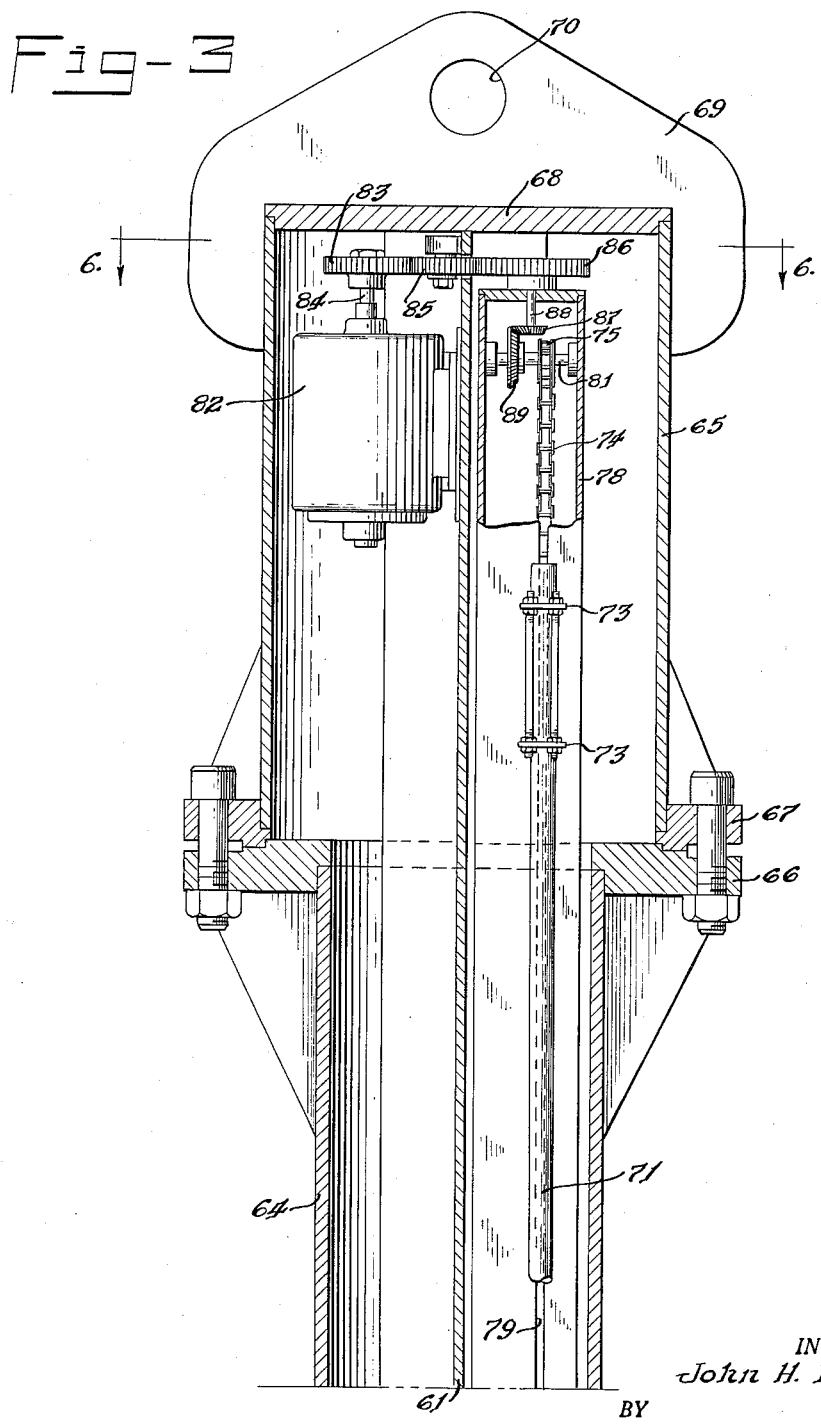

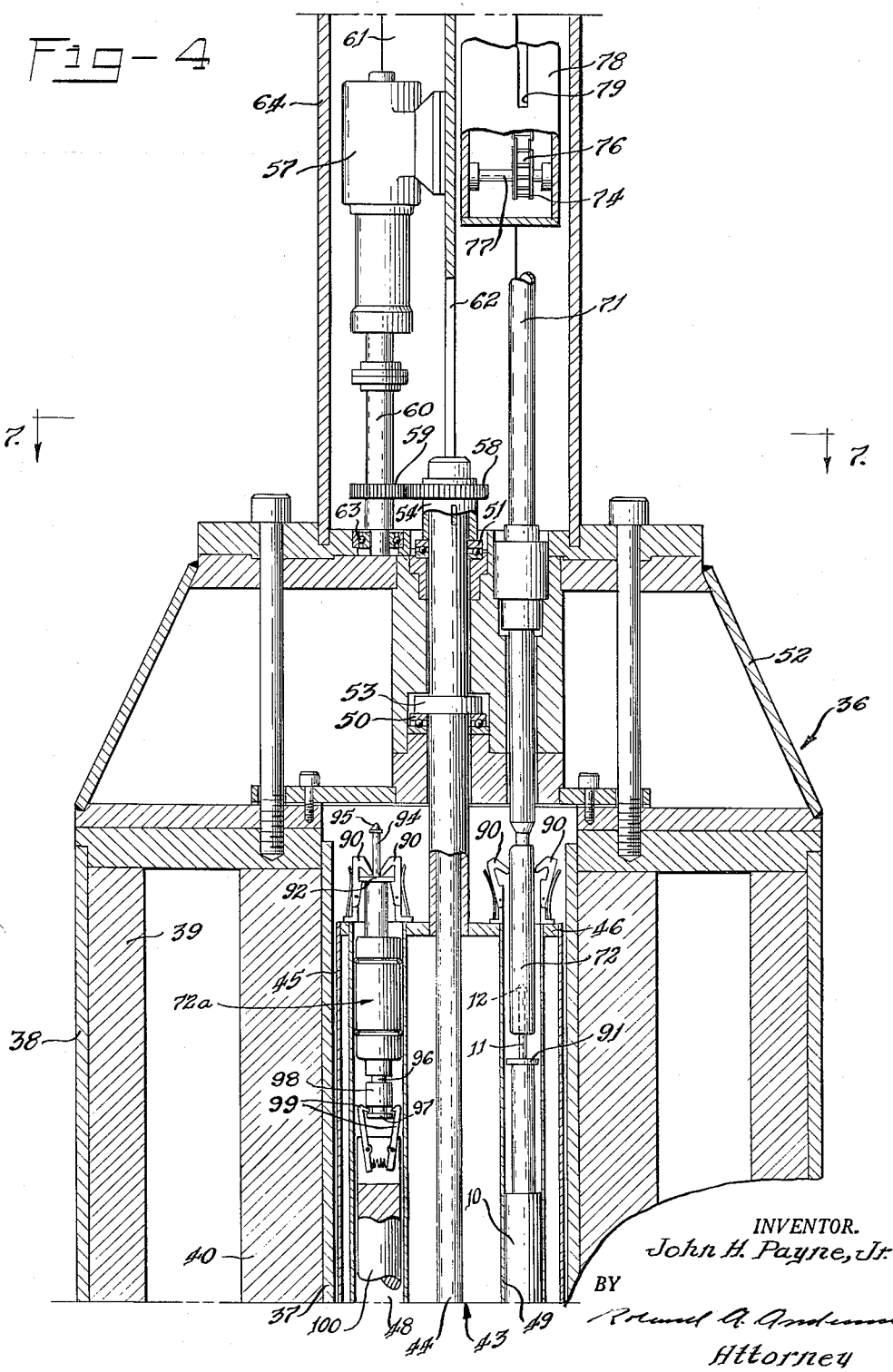

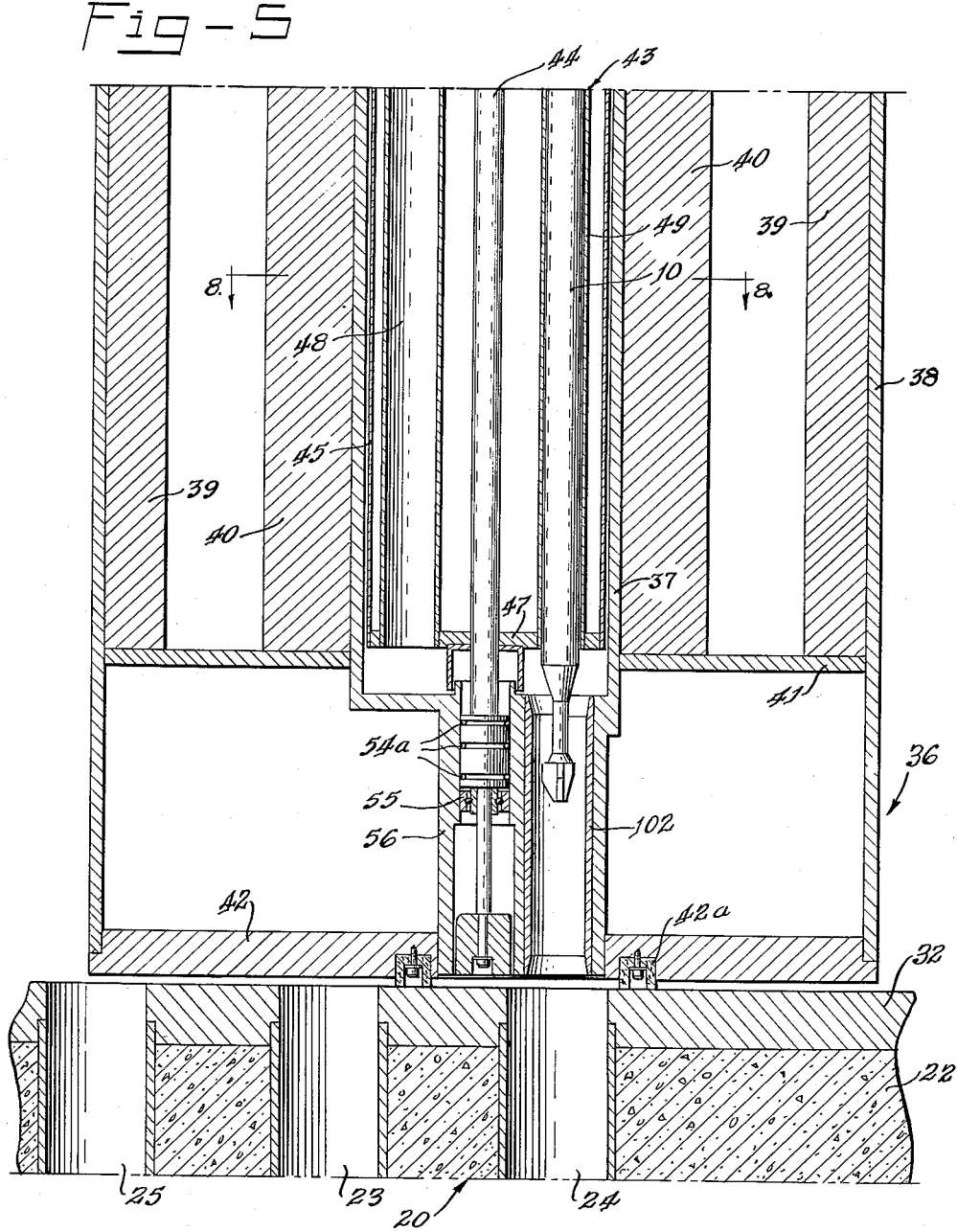

July 17, 1962 J. H. PAYNE, JR 3,044,947
APPARATUS FOR LOADING AND UNLOADING A MACHINE
Filed Oct. 24, 1956 6 Sheets-Sheet 6
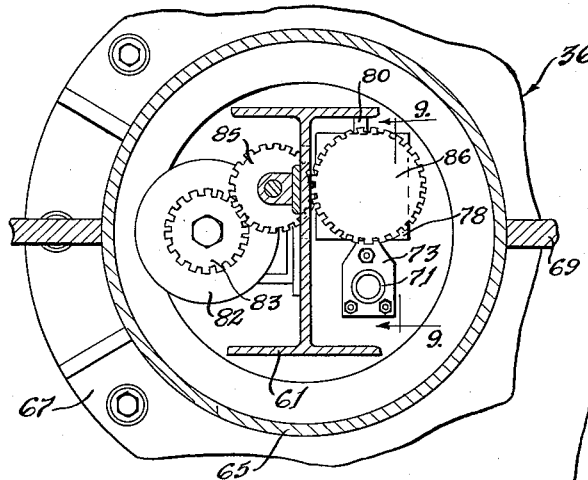
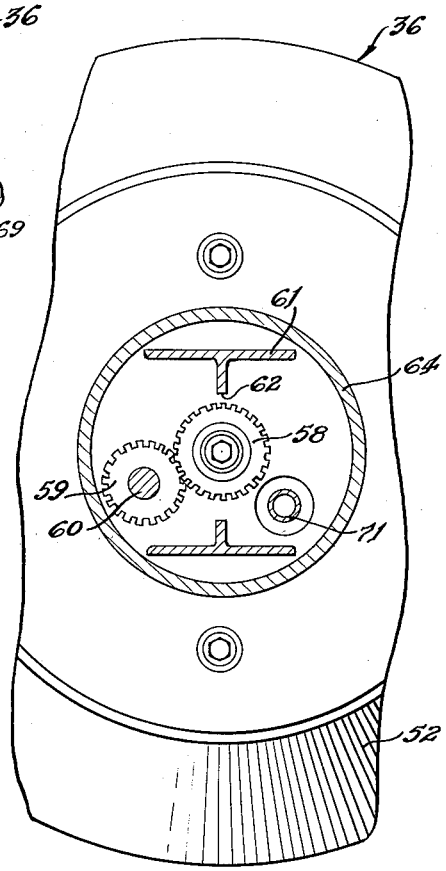
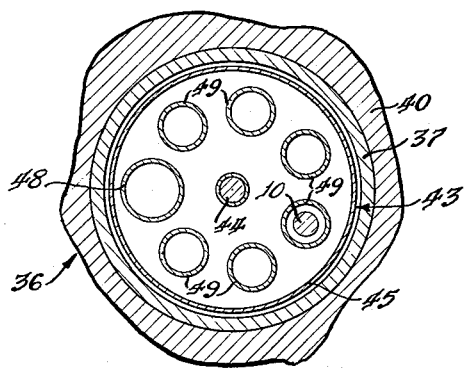
INVENTOR.
John H. Payne, Jr.
BY
Roland A. Anderson
Attorney

United States Patent Office 3,044,947
Patented July 17, 1962

3,044,947
APPARATUS FOR LOADING AND
UNLOADING A MACHINE
John H. Payne, Jr., Ballston Spa, N.Y., assignor to the United States of America as represented by the United States Atomic Energy Commission
Filed Oct. 24, 1956, Ser. No. 618,161
2 Claims. (Cl. 204—193.2)

This invention relates to an apparatus for loading and unloading, and more specifically, to an apparatus for replacing elements in a machine that requires shielding because of the radioactivity of the elements being replaced.

The fuel elements of a nuclear reactor require replacing after they have been in use for some time. It is difficult and dangerous to take out a depleted fuel element and replace it with a new one, because the depleted fuel element being removed is radioactive as is also the reactor core from which the removal is being effected.

The apparatus of the present invention includes a shield that can be maneuvered over a reactor to facilitate the removal of a plurality of fuel elements as well as a storage means for the plurality of fuel elements. According to the present invention, depleted fuel elements are removed from a reactor through one of a small number of holes in a shielding plug that is rotatably mounted in an eccentric annular plug rotatably mounted in the top of the reactor. The fuel elements being removed are stored in a plurality of openings in a rotatable magazine or storage means rotatably mounted over the aforesaid plugs.

In the drawings:

FIG. 2 is a horizontal plan view taken on the line 2—2 of FIG. 1;

Figure 1:
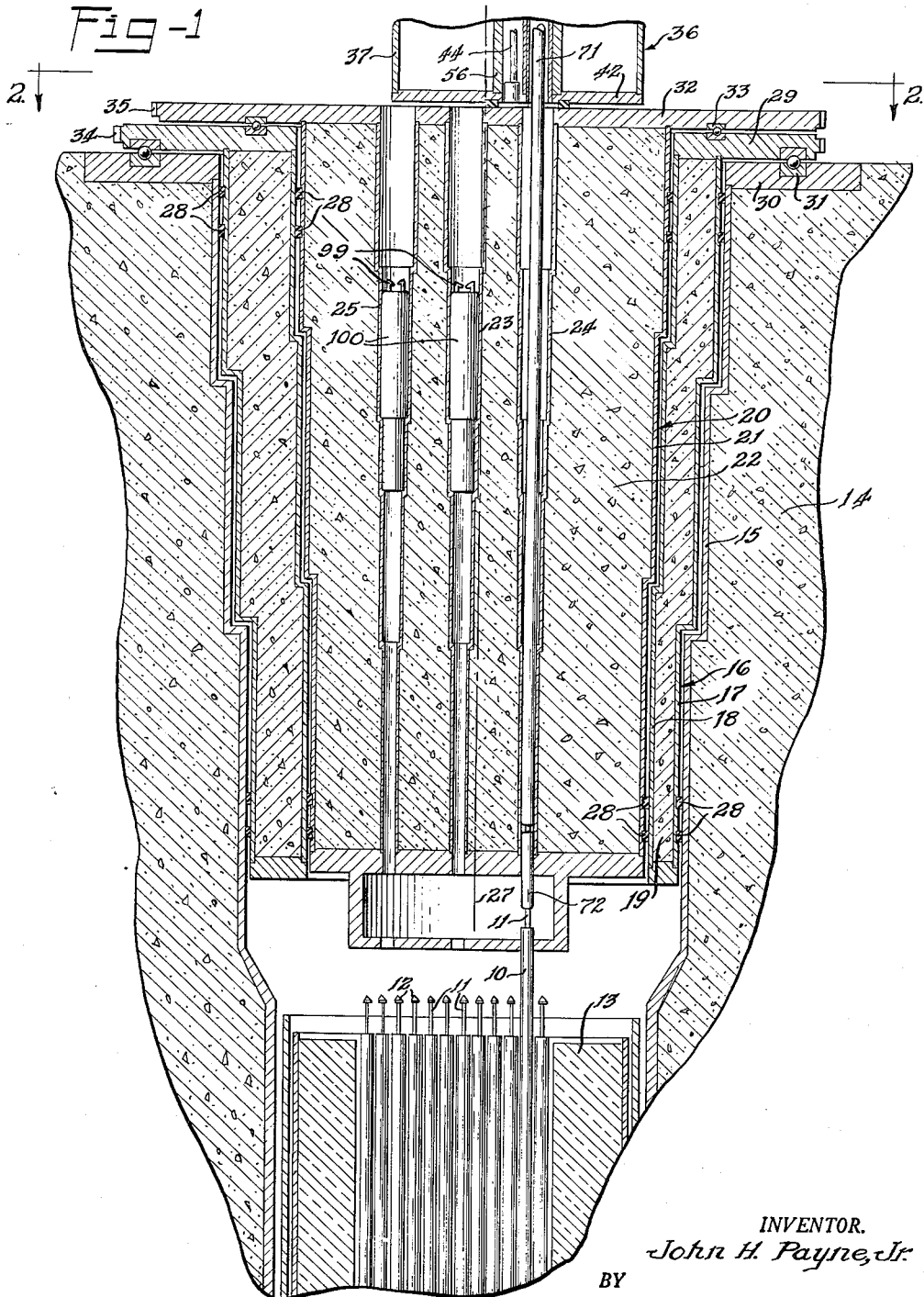
FIG. 1 is a vertical sectional view taken through shielding plugs forming part of the novel apparatus of the present invention.

FIGS. 3, 4, and 5 are vertical sectional views taken through upper, intermediate, and lower portions, respectively, of a lifting mechanism and a storage magazine forming part of the novel apparatus, a complete showing of the lifting mechanism and the storage magazine being obtained by placing FIG. 4 below FIG. 3 and FIG. 5 below FIG. 4;

FIG. 6 is a horizontal sectional view taken on the line 6—6 of FIG. 3 to show gears interconnecting the lifting mechanism and a driving motor;

FIG. 7 is a horizontal sectional view taken on the line 7—7 of FIG. 4;

FIG. 8 is a horizontal sectional view taken on the line 8—8 of FIG. 5 to show the storage magazine;

FIG. 9 is a vertical sectional view taken on the line 9—9 of FIG. 6 to show a chain and its connections, forming part of the lifting mechanism; and FIG. 10 is a fragmentary sectional view generally similar to FIG. 5 and showing a plug suspended in the lower part of the apparatus.

The novel apparatus of the present invention is illustrated as applied to a neutronic reactor in which there is a plurality of spaced parallel vertical fuel elements 10 which are to be removed and replaced by this apparatus when they become depleted. For a complete disclosure of a neutronic reactor of the type to which this apparatus may be applied, reference is made to Hurwitz et al. Patent No. 2,879,216, dated March 24, 1959. Although the apparatus of the present invention is most ideally applied to a neutronic reactor, because the apparatus includes members for shielding against radioactivity, it is to be understood that the apparatus is not dependent on the operation of any particular reactor and may be applied to machines other than reactors. The apparatus can be applied to any machine in which there is a plurality of parallel elements that must be replaced.

As shown in FIG. 1, each of the fuel elements 10 is a rod or a rodlike member and is provided at its upper end with an extension 11 and an enlarged head 12 at the upper end, to be grappled by the lifting mechanism to be described later. The fuel elements 10 may fit in tubes, not shown. Around the fuel elements is a reflector 13, which may be of graphite. Around the reflector 13 is a shield 14, which may be of concrete. The shield 14 extends to a considerably higher level than the fuel elements 10 and the reflector 13 and is provided with a stepped circular shell or liner 15 which may be of steel.

In the liner 15 there is rotatably mounted an outer annular shielding plug 16, which comprises an outer circular stepped shell 17 of steel, an inner circular stepped shell 18 of steel, and a concrete filling 19 between the shells 17 and 18. The outer shell 17 conforms to the liner 15. The inner shell 18 is eccentric to the outer shell 17 so that the concrete filling 19 is of varying thickness. In the outer plug 16 there is rotatably mounted an inner shielding plug 20, which comprises an outer stepped shell 21 of steel, a concrete filling 22, and three stepped tubes 23, 24, and 25 of steel. The outer shell 21 of the inner plug 20 conforms to the inner shell 18 of the outer plug 16. The tubes 23, 24, and 25 are parallel with the axis 27 of the outer shell 21, designated by 27, and are spaced different amounts from said axis, the tube 23 being closest to the axis, the tube 25 being farthest from the axis, and the tube 24 being nearer the axis than the tube 25 is and farther from the axis than the tube 23 is. There are annular gas seals 28 between the inner and outer shielding plugs 20 and 16 and between the outer plug 16 and the liner 15.

The outer plug 16 is provided with a steel flange 29 which extends across the top of the plug 16 and radially outward thereof across an annular steel plate 30 mounted on the top of the shield 14 around the liner 15. A bearing 31 is provided between the flange 29 and the plate 30 to permit the outer plug 16 to rotate. The inner plug 20 is provided with a steel plate 32 which extends across its top and radially outward thereof across the flange 29 of the outer plug 16. A bearing 33 is provided between the plate 32 and the flange 29 to permit rotation of the inner plug 20 with respect to the outer plug 16. The flange 29 and the plate 32 have their peripheries formed as gears 34 and 35 respectively, which driving gears, not shown, may engage for rotating the outer plug 16 and the inner plug 20.

As shown in FIG. 1, a housing 36 rests on the plate 32. As shown in FIGS. 4 and 5, the housing 36 includes inner and outer annular walls 37 and 38, and annular lead mass 40 which surrounds wall 37 and annular lead mass 39 which lies within wall 38 and defines an annular space with lead mass 40. The annular space between the lead masses 39 and 40 is filled with oil. Below the masses 39 and 40 is a ring-shaped plate 41 which is welded to the inner and outer walls 37 and 38 and extends between them. The space between the plate 41 and a base plate 42 of the housing 36 is filled with lead shot and oil. The base plate 42 carries an annular seal 42a, which cooperates with the plate 32.

Positioned within the inner annular wall 37 is a barrel or magazine 43, which comprises a shaft 44, a cylinder 45, upper and lower end plates 46 and 47, and tubes 48 and 49. The end plates 46 and 47 are secured by welding to the shaft 44 and the cylinder 45, and the tubes 46 and 47 extend between the end plates 46 and 47 and have their ends secured by welding in openings in the end plates. As shown in FIG. 8, there are a single tube 48 and six tubes 49, which are smaller in diameter than the tube 48. The magazine 43 is rotatably supported by bearings 50 and 51 associated with an upper portion of the shaft 44 lying above the cylinder 45 and the upper end plate 46. The bearings 50 and 51 are carried by a supporting structure 52 mounted on top of the housing 36. The shaft 44 is supported by the bearings 50 and 51 by means of collars 53 and 54, respectively, which are, respectively, secured to the upper portion of the shaft 44 and pinned to the end of said upper portion. The lower end of the shaft 44 has seals 54a and is given lateral support by a bearing 55 mounted in a portion 56 at the lower end of the housing 36. The magazine 43 is rotated by a motor 57 which is connected with the magazine through a gear 58 secured to the upper end of the shaft 44, a gear 59 meshing with the gear 58, and a shaft 60 with which the motor 57 is drivingly connected and upon which the gear 59 is mounted in a driving connection.

The motor 57 is supported by being secured to a vertical member 61 of I-shaped transverse section. The lower end of the vertical member 61 rests on and is secured to the top of the supporting structure 52 and is recessed as indicated at 62 so as to straddle the upper end of the shaft 44, collar 54 and gear 58. The shaft 60 is journaled and supported at its lower end by a bearing 63 mounted on the top of the supporting structure 52. The motor 57 and vertical member 61 are housed in a tubular structure 64 which has its lower end secured to the top of the supporting structure 52 and its upper end terminating short of the upper end of the vertical member 61. To the upper end of the tubular structure 64 is secured a tubular section 65 by means of rings 66 and 67 which are bolted together and are welded to the tubular structure 64 and the tubular section 65, respectively. The tubular section 65 is somewhat larger in diameter and very much shorter than tubular structure 64. The tubular section 65 is closed at its upper end by a disk 68 which is welded thereto and also to the upper end of the vertical member 61. A fitting 69 is secured to the disk 68 and the tubular section 65 and has an opening 70 to which a lifting hook may be applied.

Within the tubular structure is a hollow vertical rod 71, to the lower end of which is connected a gripping mechanism 72, which is adapted to engage the head 12 and extension 11 on one or more of the fuel elements 10 for gripping the same, as shown in FIGS. 1 and 4, or to engage a plug 72a as shown in FIG. 10. The details of the gripping mechanism 72 are not shown, since per se they do not involve invention in the present application. However, it is to be understood that the gripping mechanism may comprise an outer sleeve, an inner sleeve, and balls mounted in openings in the inner sleeve for engagement with the extension 11 or head 12 on the fuel element, release of the extension or head being enabled by retraction of the ball made possible by axial shifting of the outer sleeve with respect to the inner sleeve. A gripping mechanism of this general type is shown in Schulz Patent No. 2,751,229, dated June 19, 1956.

As shown in FIG. 9, the upper end of the rod 71 is secured by brackets 73 to the ends of a sprocket chain 74 which is in the form of a loop having its upper end trained over a driving gear 75 and its lower end trained over an idler gear 76, as shown in FIG. 4. The idler gear 76 is mounted on a shaft 77 journaled in the lower end of a casing 78, which houses the sprocket chain 74 and has a long longitudinal slot 79 through which the brackets 73 extend to the rod 71 which is exterior to the casing 78. The casing is secured to the vertical member 61 by members 80, one of which is shown in FIG. 6. The driving gear 75 is secured to a shaft 81 journaled in the upper end of the casing 78. A motor 82, which is secured to the upper end of the vertical member 61, is drivingly connected with the chain 74 through a gear 83 secured to a shaft 84 of the motor 82, an idler gear through a shaft 88, and a bevel gear 89 meshing with the idler gear 85, a bevel gear 87 secured to the gear 86 through a shaft 88, a bevel gear 89 meshing with the bevel gear 87 and secured to shaft 81, shaft 81, and gear 75.

At the top of each of the tubes 48 and 49 of the magazine 43 there is provided a pair of spring-urged latch members 90 which are adapted to engage a flange 91 of each fuel element 10 which flange is at the end of the extension 11 away from the head 12 for supporting the associated fuel element 10 or to engage a corresponding flange 92 on the plug 72a. The upper end of the plug 72a also has an extension 94 and a head 95 which correspond, respectively, to the extension 11 and head 12 on each of the fuel elements 10. The lower end of the plug 72a has an extension 96 with an enlarged end 97 and a collar 98 sliding on the extension 96 and retained thereon by the enlarged end 97. The enlarged end is engageable with a pair of spring-urged latching members 99 mounted on each of three plugs 100 positioned in the tubes 24, 25, and 26, as shown in FIGS. 1 and 4. As shown in FIG. 10, the plug 72a has ring seals 101 which are carried in external ring grooves on the plug and engage a tubular insert 102 forming part of the housing 36.

During operation of the reactor solid plugs, not shown, are positioned in the tubes 23, 24 and 25 and extend from the top thereof to regions near the plugs 100. When the fuel elements 10 are to be replaced, the reactor is shut down, and the said unshown plugs are removed from the tubes 23, 24, and 25. Now the apparatus of FIGS. 3, 4, and 5 is lowered into place, as shown in FIG. 1, so that the tubes 48 and 49 of the barrel can be successively aligned with the tube 24. The movement of this apparatus into place can be done by an overhead crane, not shown, having a hook insertable in the opening 70 of the fitting 69 (FIG. 3). The magazine 43 will have been loaded so that the tube 48 and one adjacent tube 49 are empty and the five other tubes 49 each contain a new fuel element. The tube 48 is aligned with the tube 24. The plug 72a is suspended near the bottom of the housing 36 in the position of FIG. 10 by the rod 71 and its gripping mechanism 72. The air between the base plate 42 and the plate 32 and in the tube 24 is flushed out with an inert gas. The motor 82 is actuated to drive the chain 74 which lowers the rod 71 to bring the enlarged head 97 and extension 96 of the plug 72a into engagement with the latching members 99 of the plug 100 in the tube 24. Now the motor 82 is reversed, causing the rod 71 to lift the gripping mechanism 72, which carries the plug 72a upward to the top of the tube 48, where, as shown in FIG. 4, the latches 90 hold the plug 72a. The plug 100 is suspended in the tube 48 by the plug 72a. Now the magazine 43 is angularly shifted by actuation of the motor 57 to align the empty tube 49 with the tube 24. The gripping mechanism 72 is again lowered, this time completely through and below the tube 24, until head 12 and extension 11 on the used fuel element aligned with the tube 24 is engaged. This fuel element is lifted into the tube 49 so that the latches 90 engage the flange 91. Now the magazine 43 is angularly shifted to align the next tube 49 with the tube 24. The new fuel element 10 in this next tube 49 is lowered by gripping mechanism 72 into the place in the reactor formerly occupied by the used fuel element 10 just removed.

Next, the inner plug 20 and/or the outer plug 16 is angularly adjusted through the gear 35 and/or the gear 34 to align the gripping mechanism 72 and the tube 24 with another used fuel element 10, which is now lifted by the gripping mechanism into that tube 49 from which the new fuel element 10 has been removed and inserted in the reactor. Now the magazine 43 is angularly shifted to align the next tube 49 with the tube 24. The new fuel element 10 in this next tube 49 is lowered into the place formerly occupied by the second used fuel element just removed. Now the plug 20 and/or the plug 16 is angularly adjusted to align the gripping mechanism 72 and the tube 24 with still another used fuel element 10, which is now lifted into the tube 49 just vacated by the second new fuel element 10 to be applied to the reactor.

This process is repeated until all five of the new fuel elements 10 have been transferred from the magazine 43 to the reactor, and six used fuel elements 10 have been transferred from the reactor to the six tubes 49 in the magazine 43. Now the tube 48 is aligned with the tube 24 so that the rod 71, acting through the gripping mechanism 72 and the plug 72a, may return the plug 100 from the tube 48 to the tube 24, where the plug was originally. The arrangement of the collar 98 on the extension 96 permits disengagement of the latching members 99 from the enlarged head 97. The magazine is then removed and either replaced by a new magazine with six new fuel elements or emptied and refilled with six new fuel elements. The previously described operations are now repeated. It is understood that replacement or refilling of the magazine 43 will require removal of the entire apparatus of FIGS. 3, 4, and 5 from the reactor to a shielded area.

Appropriate rotation of the inner plug 20 and the outer plug 16 can move the tube 24 over a large area and thus bring tube 24 into alignment with fuel elements 10 in the reactor contained in this area, so that these fuel elements can be removed and replaced. Moreover, the apparatus of FIGS. 3, 4, and 5 can be operated not only through the tube 24 as shown in FIG. 1 but also through the tubes 23 and 25. This requires the proper positioning of the apparatus on the plate 32. Thus through the additional use of the tubes 23 and 25 an even greater area of fuel elements in the reactor can be replaced.

The novel apparatus of the present invention comprising the rotatable magazine 43 for replacing used fuel elements with new ones and the arrangement of inner plug 20 in outer plug 16 for moving the magazine over a wide area of fuel elements is applicable to any type of machine containing a large number of replaceable elements placed side by side, and more particularly, to any reactor having this arrangement of fuel elements. A reactor of this type is shown and claimed in the aforementioned Hurwitz et al. application, Serial No. 408,628.

It will be understood that the showing of the reactor has been considerably simplified, and only enough detail has been illustrated to disclose the operation and use of the magazine 43 and the plugs 20 and 16. If the reactor is controlled by vertical control rods that are adjusted vertically into and out of the reactor for varying the level of reactivity, the control rods may extend through appropriate openings in the plug 20. Such control rods and raising mechanisms therefor are removed after the reactor is shut down and the openings for the control rods in the plug 20 are plugged before the apparatus of FIGS. 3, 4, and 5 is brought into place on the plug 20.

The intention is to limit the invention only within the scope of the appended claims.

What is claimed is:

1. Apparatus for replacing spaced parallel elements in a machine, said apparatus comprising an outer annular shielding plug having a circular exterior fitting a circular opening in a shield for the machine and a circular interior eccentric to said circular exterior, an inner shielding plug having a circular exterior fitting the circular interior of the outer plug and a plurality of openings parallel to the axis of the inner plug and to the said elements in the machine and being spaced different amounts from said axis, rotation of the inner plug and the outer plug about the axis of the outer plug and rotation of the inner plug about its own axis with respect to the outer plug enabling one or more of the openings in the inner plug to be brought into alignment with each of the elements in the machine, a rotatable magazine having a plurality of openings spaced equal amounts from the axis of rotation of the magazine, two concentric annular shielding masses surrounding said magazine openings with the annular space between said masses filled with oil, and means mounting the magazine for rotation on the side of the inner plug opposite to that where the fuel elements to be replaced are located to enable the openings of the magazine to be brought successively into alignment with the openings of the inner plug.

2. Apparatus for replacing vertical spaced parallel elements in a machine, said apparatus comprising an outer annular shielding plug having a circular exterior fitting a circular opening having a vertical axis in a shield at the top of the machine and a circular interior eccentric to said circular exterior, an inner shielding plug having a circular exterior fitting the circular interior of the outer plug and three vertical openings parallel to the axis of the inner plug and to the said elements in the machine and being spaced different amounts from said axis, rotation of the inner plug and the outer plug about the axis of the outer plug and rotation of the inner plug about its own axis with respect to the outer plug enabling one or more of the openings in the inner plug to be brought into alignment with each of the elements in the machine, a magazing having a vertical axis of rotation and a plurality of openings spaced equal amounts from said axis and means mounting two concentric annular shielding masses surrounding said magazine openings with the annular space between said masses filled with oil, the magazine for rotation on the side of the inner plug opposite to that where the fuel elements to be replaced are located to enable the openings of the magazine to be brought successively into alignment with the openings of the inner plug.

References Cited in the file of this patent

Proceedings of the International Conference on the Peaceful Uses of Atomic Energy August 8–20, 1955, vol. 3, United Nations, New York, pages 194–196 (Kendall et al.), 299, 309–311 (Parkins), 332, 340–342 (Barnes et al.).

McLain et al.: "Problems in Nuclear Engineering," vol. 1, pp. 271–273, Permagon Press, 1957; this paper was delivered at the 1st Nuclear Engineering and Science Congress, Cleveland, Ohio, December 12–16, 1955, 204/154.39.

UNITED STATES PATENT OFFICE
CERTIFICATE OF CORRECTION

Patent No. 3,044,947            July 17, 1962

John H. Payne, Jr.

It is hereby certified that error appears in the above numbered patent requiring correction and that the said Letters Patent should read as corrected below.

Column 3, line 74, for "through a shaft 88, and a bevel gear 89 meshing with the" read -- 85 meshing with the gear 83, a gear 86 meshing with the --; column 6, line 39, for "magazing" read -- magazine --; line 41, beginning with "and means mounting" strike out all to and including "oil," in line 44, and insert instead --, two concentric annular shielding masses surrounding said magazine opening's with the annular space between said masses filled with oil, and means mounting --.

Signed and sealed this 26th day of February 1963.

(SEAL)
Attest:

ESTON G. JOHNSON
Attesting Officer

DAVID L. LADD
Commissioner of Patents